United States Patent
Hepler et al.

(10) Patent No.: US 8,112,635 B2
(45) Date of Patent: *Feb. 7, 2012

(54) DATA-MOVER CONTROLLER WITH PLURAL REGISTERS FOR SUPPORTING CIPHERING OPERATIONS

(75) Inventors: Edward L. Hepler, Malvern, PA (US); Robert G. Gazda, Spring City, PA (US)

(73) Assignee: InterDigital Technology Corporation, Wilmington, DE (US)

( * ) Notice: Subject to any disclaimer, the term of this patent is extended or adjusted under 35 U.S.C. 154(b) by 91 days.

This patent is subject to a terminal disclaimer.

(21) Appl. No.: 12/634,363

(22) Filed: Dec. 9, 2009

(65) Prior Publication Data
US 2010/0088529 A1    Apr. 8, 2010

Related U.S. Application Data

(63) Continuation of application No. 10/878,729, filed on Jun. 28, 2004, now Pat. No. 7,636,857.

(60) Provisional application No. 60/573,789, filed on May 24, 2004.

(51) Int. Cl.
*H04N 7/16* (2011.01)
*G06F 13/00* (2006.01)
*G06F 17/30* (2006.01)

(52) U.S. Cl. ............. 713/189; 713/181; 726/26; 710/33

(58) Field of Classification Search .................. 713/181, 713/186; 726/26; 710/33
See application file for complete search history.

(56) References Cited

U.S. PATENT DOCUMENTS

| 4,646,230 | A  | 2/1987  | Eguchi |
| 5,224,166 | A  | 6/1993  | Hartman, Jr. |
| 6,038,166 | A  | 3/2000  | Wong |
| 7,036,017 | B2 | 4/2006  | Gammel et al. |
| 7,246,247 | B2 | 7/2007  | Matsuzaki et al. |
| 7,289,630 | B2 | 10/2007 | Vialen et al. |
| 7,409,477 | B2 | 8/2008  | Wyatt et al. |
| 7,415,115 | B2 | 8/2008  | Ma |
| 7,418,598 | B1 | 8/2008  | Le Quere |
| 7,484,104 | B2 | 1/2009  | Masui et al. |

(Continued)

FOREIGN PATENT DOCUMENTS
EP           1 156 694         11/2001
(Continued)

OTHER PUBLICATIONS

3GPP TS 55.216 v6.2.0, Sep. 2003, pp. 1-27.*
(Continued)

*Primary Examiner* — Matthew Henning
(74) *Attorney, Agent, or Firm* — Volpe and Koenig, P.C.

(57) ABSTRACT

A data processing system ciphers and transfers data between a first memory unit and a second memory unit, such as, for example, between a share memory architecture (SMA) static random access memory (SRAM) and a double data rate (DDR) synchronous dynamic random access memory (SDRAM). The system includes a ciphering engine and a data-mover controller. The data-mover controller includes at least one register having a field that specifies whether or not the transferred data should be ciphered. If the field specifies that the transferred data should be ciphered, the field also specifies the type of ciphering that is to be performed, such as a third generation partnership project (3GPP) standardized confidentially cipher algorithm "f8" or integrity cipher algorithm "f9".

44 Claims, 9 Drawing Sheets

U.S. PATENT DOCUMENTS

| | | | |
|---|---|---|---|
| 7,636,857 B2 * | 12/2009 | Hepler et al. | 713/189 |
| 7,694,152 B2 * | 4/2010 | Carr | 713/189 |
| 2003/0215090 A1 | 11/2003 | Saito et al. | |
| 2003/0226029 A1 | 12/2003 | Porter et al. | |
| 2004/0131186 A1 | 7/2004 | Kasuya et al. | |
| 2004/0156499 A1 | 8/2004 | Heo et al. | |
| 2005/0015583 A1 | 1/2005 | Sarkkinen et al. | |
| 2005/0256698 A1 | 11/2005 | Becks | |
| 2006/0153380 A1 | 7/2006 | Gertner | |

FOREIGN PATENT DOCUMENTS

| | | |
|---|---|---|
| GB | 2364407 | 1/2002 |
| JP | 2002329180 | 11/2002 |
| RU | 2003118753 | 2/2004 |
| WO | 02/101977 | 12/2002 |
| WO | 2004/019614 | 3/2004 |

OTHER PUBLICATIONS

3GPP TS 35.201 v3.2.0, Dec. 2001, Entire Document.
3GPP TS 55.216 v6.2.0, Sep. 2003.
Iwata et al., "New Security Proofs for the 3GPP Confidentiality and Integrity Algorithms," Jan. 26, 2004.
Leech, M. "RFC3607—Chinese Lottery Cryptanalysis Revisited: The Internet as a Codebreaking Tool.", Sep. 2003.
3GPP TS 35.201 V5.0.0, Jun. 2002, pp. 1-22.

* cited by examiner

DM_SDRAM_SOURCE_ADDRESS
THIS REGISTER DEFINES THE DATA MOVER STARTING ADDRESS FOR SOURCE ACCESSES TO SDRAM.

| NAME: | DM_SDRAM_SOURCE_ADDRESS | ADDRESS: | 0x08e00100 | WRITTEN BY: | RIGHT ARM |
|---|---|---|---|---|---|
| BIT: | 31 30 29 28 27 26 25 24 23 22 21 20 19 18 17 16 15 14 13 12 11 10 9 8 7 6 5 4 3 2 1 0 |
| DATA: | ADDR |

| FIELD | ENUMERATION | BIT INDEX |
|---|---|---|
| ADDR | | 31:0 |

DM_SDRAM_DESTINATION_ADDRESS
THIS REGISTER DEFINES THE DATA MOVER STARTING ADDRESS FOR DESTINATION ACCESSES TO SDRAM.

| NAME: | DM_SDRAM_DESTINATION_ADDRESS | ADDRESS: | 0x08e00110 | WRITTEN BY: | RIGHT ARM |
|---|---|---|---|---|---|
| BIT: | 31 30 29 28 27 26 25 24 23 22 21 20 19 18 17 16 15 14 13 12 11 10 9 8 7 6 5 4 3 2 1 0 |
| DATA: | ADDR |

| FIELD | ENUMERATION | BIT INDEX |
|---|---|---|
| ADDR | | 31:0 |

DM_SMA_SOURCE_ADDRESS
THIS REGISTER DEFINES THE DATA MOVER STARTING ADDRESS FOR SOURCE ACCESSES TO SMA.

| NAME: | DM_SMA_SOURCE_ADDRESS | | | | | | | | | | | | | ADDRESS: | | | SMA POINTER | | | | | | WRITTEN BY: | | RIGHT ARM | | | | | | |
|---|---|---|---|---|---|---|---|---|---|---|---|---|---|---|---|---|---|---|---|---|---|---|---|---|---|---|---|---|---|---|---|---|
| BIT: | 31 | 30 | 29 | 28 | 27 | 26 | 25 | 24 | 23 | 22 | 21 | 20 | 19 | 18 | 17 | 16 | 15 | 14 | 13 | 12 | 11 | 10 | 9 | 8 | 7 | 6 | 5 | 4 | 3 | 2 | 1 | 0 |
| DATA: | ADDR | | | | | | | | | | | | | | | | | | | | | | | | | | | | | | | |

| FIELD | ENUMERATION | BIT INDEX |
|---|---|---|
| ADDR | | 31:0 |

DM_SMA_DESTINATION_ADDRESS
THIS REGISTER DEFINES THE DATA MOVER STARTING ADDRESS FOR DESTINATION ACCESSES TO SMA.

| NAME: | DM_SMA_DESTINATION_ADDRESS | | | | | | | | | | | | | ADDRESS: | | | SMA POINTER | | | | | | WRITTEN BY: | | RIGHT ARM | | | | | | |
|---|---|---|---|---|---|---|---|---|---|---|---|---|---|---|---|---|---|---|---|---|---|---|---|---|---|---|---|---|---|---|---|---|
| BIT: | 31 | 30 | 29 | 28 | 27 | 26 | 25 | 24 | 23 | 22 | 21 | 20 | 19 | 18 | 17 | 16 | 15 | 14 | 13 | 12 | 11 | 10 | 9 | 8 | 7 | 6 | 5 | 4 | 3 | 2 | 1 | 0 |
| DATA: | ADDR | | | | | | | | | | | | | | | | | | | | | | | | | | | | | | | |

| FIELD | ENUMERATION | BIT INDEX |
|---|---|---|
| ADDR | | 31:0 |

DM_NUM_BLOCKS
THIS REGISTER DEFINES THE NUMBER OF BLOCKS TO BE MOVED BETWEEN SDRAM AND SMA MEMORY. EACH BLOCK CONSISTS OF THE NUMBER OF WORDS SPECIFIED BY THE "MODE" REGISTER (UP TO 8 4-BYTE WORDS (32 BYTES)).

| NAME: | DM_NUM_BLOCKS | | | | | | | | | | | | | | ADDRESS: | 0x08e00120 | | | | | WRITTEN BY: | RIGHT ARM | | | | | | | | | | |
|---|---|---|---|---|---|---|---|---|---|---|---|---|---|---|---|---|---|---|---|---|---|---|---|---|---|---|---|---|---|---|---|---|
| BIT: | 31 | 30 | 29 | 28 | 27 | 26 | 25 | 24 | 23 | 22 | 21 | 20 | 19 | 18 | 17 | 16 | 15 | 14 | 13 | 12 | 11 | 10 | 9 | 8 | 7 | 6 | 5 | 4 | 3 | 2 | 1 | 0 |
| DATA: | | | | | | | | | | | | | | | | | NUM | | | | | | | | | | | | | | | |

| FIELD | ENUMERATION | BIT INDEX | DESCRIPTION |
|---|---|---|---|
| RESERVED | | 31:16 | FUTURE USE |
| NUM | | 15:0 | SPECIFIES THE NUMBER OF BLOCKS TO MOVE BETWEEN SDRAM AND SMA MEMORIES. |
| DESCRIPTION: | | | NOTE THAT WRITING THIS REGISTER STARTS THE DATA MOVER. WHEN WRITTEN, THE 'f' BIT OF THE "MODE" REGISTER IS CLEARED. WHEN THE TRANSFERS HAVE COMPLETED, THE 'f' BIT IS SET AND AN OPTIONAL INTERRUPT PULSE IS GENERATED. |

DM_MODE 230
THIS REGISTER SPECIFIES THE MODE OF THE DATA MOVER.

| NAME: | DM_MODE | | | | | | | | | | | | | | | ADDRESS: | 0x08e00130 | | | | | | | | WRITTEN BY: | RIGHT ARM | | | | | | |
|---|---|---|---|---|---|---|---|---|---|---|---|---|---|---|---|---|---|---|---|---|---|---|---|---|---|---|---|---|---|---|---|---|
| BIT: | 31 | 30 | 29 | 28 | 27 | 26 | 25 | 24 | 23 | 22 | 21 | 20 | 19 | 18 | 17 | 16 | 15 | 14 | 13 | 12 | 11 | 10 | 9 | 8 | 7 | 6 | 5 | 4 | 3 | 2 | 1 | 0 |
| DATA: | f | | | | | | | | | | | | | | | | | | | | | | | | | c | c | i | d | d | bs | bs |

| FIELD | ENUMERATION | BIT INDEX | DESCRIPTION |
|---|---|---|---|
| f | '0'-NOT DONE<br>'1'-DONE | 31 | FINISHED FLAG |
| RESERVED | | 30:7 | FUTURE USE |
| c | '00'-NO CIPHERING<br>'01'-DATA IS MOVED USING f8 TYPE CIPHERING<br>'10'-DATA IS ACCESSED AND f9 CIPHERING IS PERFORMED | 6:5 | SPECIFIES CIPHER MODE |
| i | '0'-NO INTERRUPT IS GENERATED<br>'1'-INTERRUPT IS GENERATED WHEN MOVEMENT IS COMPLETE | 4 | SPECIFIES WHETHER AN INTERRUPT PULSE SHOULD BE GENERATED WHEN THE DATA MOVEMENT HAS COMPLETED |
| d | '00'-SMA TO SDRAM<br>'01'-SDRAM TO SDRAM<br>'10'-SDRAM TO SMA | 3:2 | SPECIFIES DIRECTION OF DATA MOVEMENT |
| bs | '00'-ONE WORD (4 BYTES)<br>'01'-TWO WORDS (8 BYTES)<br>'10'-FOUR WORDS (16 BYTES)<br>'11'-EIGHT WORDS (32 BYTES) | 1:0 | SPECIFIES THE SIZE OF THE BLOCK TO MOVE |

DESCRIPTION: THE MODE REGISTER DETERMINES THE SIZE OF THE BLOCKS ACTED UPON BY THE DATA MOVER. IT ALSO SPECIFIES THE DIRECTION OF MOVEMENT AND WHETHER OR NOT AN INTERRUPT IS GENERATED WHEN THE DATA MOVEMENT HAS COMPLETED. NOTE THAT "BURSTS" INTO/OUT OF SDRAM WILL BE MADE BASED ON THE BLOCK SIZE.

DM_CIPHER_COUNT  235
THIS REGISTER DEFINES THE COUNT VALUE EMBEDDED IN THE CIPHER HEADER.

| NAME: | DM_CIPHER_COUNT | | | | | | | | | | | | | | | ADDRESS: | 0x08e00140 | | | | | | | | | WRITTEN BY: | RIGHT ARM | | | | |
|---|---|---|---|---|---|---|---|---|---|---|---|---|---|---|---|---|---|---|---|---|---|---|---|---|---|---|---|---|---|---|---|---|
| BIT: | 31 | 30 | 29 | 28 | 27 | 26 | 25 | 24 | 23 | 22 | 21 | 20 | 19 | 18 | 17 | 16 | 15 | 14 | 13 | 12 | 11 | 10 | 9 | 8 | 7 | 6 | 5 | 4 | 3 | 2 | 1 | 0 |
| DATA: | COUNT | | | | | | | | | | | | | | | | | | | | | | | | | | | | | | | |

| FIELD | ENUMERATION | BIT INDEX | DESCRIPTION |
|---|---|---|---|
| COUNT | | 31:0 | SPECIFIES THE COUNT VALUE EMBEDDED IN THE CIPHER HEADER. |
| DESCRIPTION: | | | THIS REGISTER SPECIFIES THE COUNT VALUE EMBEDDED IN THE CIPHER HEADER. IT MUST BE WRITTEN BEFORE THE DATA MOVER IS STARTED (WHEN CIPHERING MODE IS USED). |

FIG. 10

DM_CIPHER_FRESH  240
THIS REGISTER DEFINES THE FRESH VALUE EMBEDDED IN THE CIPHER HEADER.

| NAME: | DM_CIPHER_FRESH | | | | | | | | | | | | | | | ADDRESS: | 0x08e00150 | | | | | | | | | WRITTEN BY: | RIGHT ARM | | | | |
|---|---|---|---|---|---|---|---|---|---|---|---|---|---|---|---|---|---|---|---|---|---|---|---|---|---|---|---|---|---|---|---|---|
| BIT: | 31 | 30 | 29 | 28 | 27 | 26 | 25 | 24 | 23 | 22 | 21 | 20 | 19 | 18 | 17 | 16 | 15 | 14 | 13 | 12 | 11 | 10 | 9 | 8 | 7 | 6 | 5 | 4 | 3 | 2 | 1 | 0 |
| DATA: | COUNT | | | | | | | | | | | | | | | | | | | | | | | | | | | | | | | |

| FIELD | ENUMERATION | BIT INDEX | DESCRIPTION |
|---|---|---|---|
| COUNT | | 31:0 | SPECIFIES THE FRESH VALUE EMBEDDED IN THE CIPHER HEADER. |
| DESCRIPTION: | | | THIS REGISTER SPECIFIES THE FRESH VALUE EMBEDDED IN THE CIPHER HEADER. THIS VALUE IS ONLY USED IN THE "f9" CIPHER MODE. IT MUST BE WRITTEN BEFORE THE DATA MOVER IS STARTED (WHEN CIPHERING MODE IS USED). |

DM_CIPHER_MODE
THIS REGISTER REPORTS WHICH FIRQ INTERRUPT SOURCES ARE CURRENTLY ACTIVE.
THE ACTIVE FIRQ INTERRUPT BITS ARE CLEARED.

| NAME: | DM_CIPHER_MODE | | | | | | | | | | | | | | ADDRESS: | 0x08e00130 | | | WRITTEN BY: | RIGHT ARM | | | | | | | | | | | | |
|---|---|---|---|---|---|---|---|---|---|---|---|---|---|---|---|---|---|---|---|---|---|---|---|---|---|---|---|---|---|---|---|---|
| BIT: | 31 | 30 | 29 | 28 | 27 | 26 | 25 | 24 | 23 | 22 | 21 | 20 | 19 | 18 | 17 | 16 | 15 | 14 | 13 | 12 | 11 | 10 | 9 | 8 | 7 | 6 | 5 | 4 | 3 | 2 | 1 | 0 |
| DATA: | BEARER | | | | | d | | | | | | | | | LENGTH | | | | | | | | | | | | | | | | | |

| FIELD | ENUMERATION | BIT INDEX | DESCRIPTION |
|---|---|---|---|
| BEARER | | 31:27 | SPECIFIES THE BEARER VALUE EMBEDDED IN THE ENCRYPTED HEADER. |
| d | | 26 | SPECIFIES DIRECTION VALUE EMBEDDED IN THE ENCRYPTED HEADER. |
| RESERVED | | 25:18 | FUTURE USE |
| LENGTH | | 17:0 | SPECIFIES THE ENCRYPTION LENGTH (BITS). |
| DESCRIPTION: | THIS REGISTER CONTAINS THE BEARER AND DIRECTION VALUES EMBEDDED IN THE CIPHER HEADER. THE LENGTH FIELD SPECIFIES THE NUMBER OF DATA BITS TO BE CIPHERED. | | |

DM_CIPHER_KEY_n
THESE REGISTERS DEFINE THE 128-BIT KEY USED FOR CIPHERING DURING DATA MOVEMENT.

| NAME: | DM_CIPHER_KEY_n | | | | | | | | | | | | | | ADDRESS: | | | 0x08e001n0 | | | | | | WRITTEN BY: | | | RIGHT ARM | | | | |
|---|---|---|---|---|---|---|---|---|---|---|---|---|---|---|---|---|---|---|---|---|---|---|---|---|---|---|---|---|---|---|---|
| BIT: | 31 | 30 | 29 | 28 | 27 | 26 | 25 | 24 | 23 | 22 | 21 | 20 | 19 | 18 | 17 | 16 | 15 | 14 | 13 | 12 | 11 | 10 | 9 | 8 | 7 | 6 | 5 | 4 | 3 | 2 | 1 | 0 |
| DATA: | KEY | | | | | | | | | | | | | | | | | | | | | | | | | | | | | | | |

| FIELD | ENUMERATION | BIT INDEX | DESCRIPTION |
|---|---|---|---|
| KEY | KEY_0 HOLDS BITS 127:96; KEY_1 HOLDS BITS 95:64; KEY_2 HOLDS BITS 63:32; KEY_3 HOLDS BITS 31:0. | 31:0 | SPECIFIES THE 128-BIT KEY USED FOR CIPHERING AS DATA IS MOVED. |
| DESCRIPTION: | THESE REGISTERS HOLD THE 128-BIT KEY USED FOR CIPHERING AS DATA IS MOVED BY THE DATA MOVER. THESE REGISTERS MUST BE WRITTEN BEFORE THE DATA MOVER IS STARTED (WHEN CIPHERING MODE IS USED). | | |

FIG. 13

DM_CIPHER_MAC
THIS REGISTER PROVIDES THE CALCULATED MAC VALUE.

| NAME: | DM_CIPHER_MAC | | | | | | | | | | | | | | ADDRESS: | | | 0x08e00200 | | | | | | WRITTEN BY: | | | RIGHT ARM | | | | |
|---|---|---|---|---|---|---|---|---|---|---|---|---|---|---|---|---|---|---|---|---|---|---|---|---|---|---|---|---|---|---|---|
| BIT: | 31 | 30 | 29 | 28 | 27 | 26 | 25 | 24 | 23 | 22 | 21 | 20 | 19 | 18 | 17 | 16 | 15 | 14 | 13 | 12 | 11 | 10 | 9 | 8 | 7 | 6 | 5 | 4 | 3 | 2 | 1 | 0 |
| DATA: | MAC | | | | | | | | | | | | | | | | | | | | | | | | | | | | | | | |

| FIELD | ENUMERATION | BIT INDEX | DESCRIPTION |
|---|---|---|---|
| MAC | | 31:0 | SPECIFIES CALCULATED MAC VALUE AFTER f9 CIPHER CALCULATION. |
| DESCRIPTION: | THIS REGISTER CONTAINS THE RESULT AFTER PERFORMING THE f9 CIPHER CALCULATION. | | |

DATA-MOVER CONTROLLER WITH PLURAL REGISTERS FOR SUPPORTING CIPHERING OPERATIONS

CROSS REFERENCE TO RELATED APPLICATIONS

This application is a continuation of U.S. patent application Ser. No. 10/878,729 filed Jun. 28, 2004, which claims the benefit of U.S. Provisional Application No. 60/573,789, filed May 24, 2004, which are incorporated by reference as if fully set forth.

FIELD OF THE INVENTION

The present invention relates to the field of data processing which may be used for wireless communication applications. More specifically, the present invention relates to the ciphering and transferring of data between two different types of memory devices using a data-mover controller and a ciphering engine.

BACKGROUND

Many early Third Generation Partnership Project (3GPP) modems implement the layer 1 protocol in software. As data rates have increased, the need for hardware support for some functions has been required. In wireless communication systems such as 3GPP, Global System for Mobile Communications (GSM) and Universal Mobile Telecommunications Systems (UMTS), hardware modules have recently been introduced to act as accelerators for some of the more compute-intensive operations.

One such operation is ciphering, whereby the manipulation of encryption keys and the actual encryption of data increases required processing capacity in proportion to the amount of data being manipulated. Within the security architecture of a 3GPP system, there are two standardized algorithms: a confidentially cipher algorithm "f8" and an integrity cipher algorithm "f9".

A means for efficiently performing ciphering calculations while data is being moved from one memory (i.e., layer) to another is desired.

SUMMARY

A data processing system ciphers and transfers data between a first memory unit and a second memory unit, such as, for example, between a share memory architecture (SMA) static random access memory (SRAM) and a double data rate (DDR) synchronous dynamic random access memory (SDRAM). The system includes a ciphering engine and a data-mover controller. The data-mover controller includes at least one register having a field that specifies whether or not the transferred data should be ciphered by the ciphering engine.

If the field specifies that the transferred data should be ciphered, the field may also specify the type of ciphering that is to be performed by the ciphering engine, such as a 3GPP standardized confidentially cipher algorithm "f8" or integrity cipher algorithm "f9".

The register may include another field which specifies a message authentication code (MAC) value calculated by the standardized integrity cipher algorithm f9 calculation.

The register may include yet another field which specifies whether data is moved from the first memory unit to the second memory unit, or from the second memory unit to the first memory unit. The first and second memory units may differ in processing speed.

The register may include yet another field which specifies the size of a block of data to be transferred by the data-mover controller. The data block size may be four bytes, eight bytes, sixteen bytes or thirty-two bytes.

The register may include yet another field which specifies the number of data blocks to be transferred by the data-mover controller.

The register may include yet another field which specifies whether an interrupt pulse should be generated when the transfer of data is completed.

The register may include yet another field which specifies a value embedded in a cipher header and processed by the ciphering engine.

The register may include yet another field which specifies an encryption length.

The register may include yet another field which specifies a value embedded in an encrypted header and processed by the ciphering engine.

The register may include yet another field which specifies a key used by the ciphering engine for ciphering the data as it is moved. The key may be a 128-bit key.

BRIEF DESCRIPTION OF THE DRAWINGS

A more detailed understanding of the invention may be had from the following description, given by way of example and to be understood in conjunction with the accompanying drawings wherein:

FIG. 3 shows a register defining the data-mover controller starting address for source accesses from SDRAM;

FIG. 4 shows a register defining the data-mover controller starting address for destination accesses to SDRAM;

FIG. 5 shows a register defining the data-mover controller starting address for source accesses to SMA memory;

FIG. 6 shows a register defining the data-mover controller starting address for destination accesses to SMA memory;

FIG. 7 shows a register defining the number of blocks to be moved between SDRAM and SMA memory;

FIG. 8 shows a register specifying the mode of the data-mover controller;

FIG. 9 shows a register defining a count value embedded in a cipher head;

FIG. 10 shows a register defining a fresh value embedded in the cipher head;

FIG. 11 shows a register defining a bearer and direction value that must be placed in the encrypted header and the total number of bits to be encrypted;

FIG. 12 shows a register defining a 128-bit key used for ciphering during data movement; and FIG. 13 shows a register which provides a calculated Message Authentication Code (MAC) value.

DETAILED DESCRIPTION OF THE PREFERRED EMBODIMENT(S)

Figure 1:
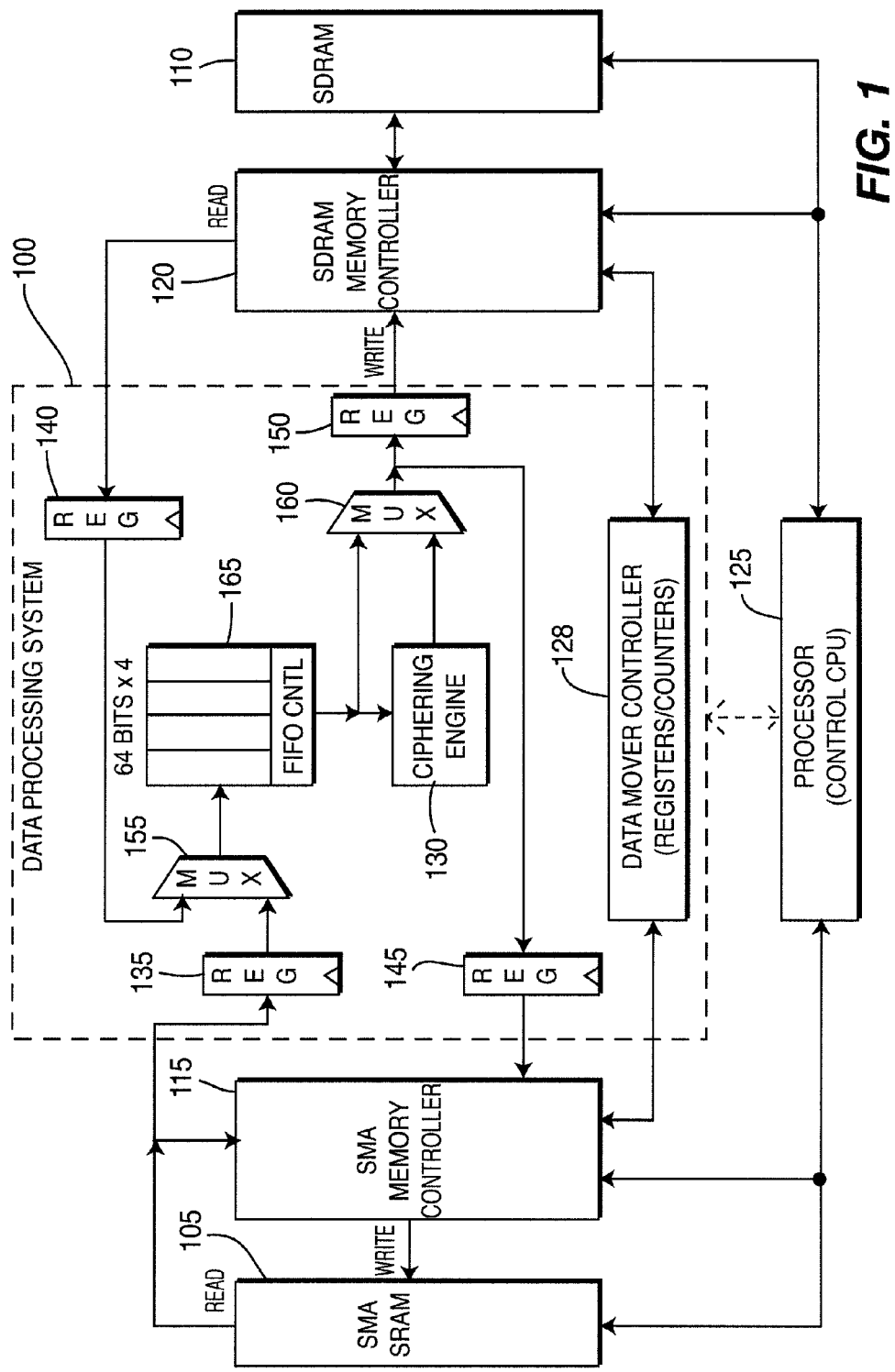
FIG. 1 is a diagram of a data processing system for ciphering and transferring data from one memory to another in accordance with a preferred embodiment of the present invention.

The preferred embodiments will be described with reference to the drawing figures where like numerals represent like elements throughout.

Preferably, the present invention disclosed herein is incorporated into a wireless transmit/receive unit (WTRU) and/or a Node B. However, it is envisioned that the just about any wireless communication scheme could benefit from the present invention.

Hereinafter, a WTRU includes but is not limited to a user equipment, mobile station, fixed or mobile subscriber unit, pager, or any other type of device capable of operating in a wireless environment. Furthermore, a Node B includes, but is not limited to, a base station, site controller, access point or other interfacing device in a wireless environment.

The features of the present invention may be incorporated into an integrated circuit (IC) or be configured in a circuit comprising a multitude of interconnecting components.

The present invention is applicable to communication systems using time division duplex (TDD), frequency division duplex (FDD), code division multiple access (CDMA), CDMA 2000, time division synchronous CDMA (TD-SCDMA), orthogonal frequency division multiplexing (OFDM) or the like.

The present invention, like many other modem implementations, has hardware modules (accelerators) to implement data processing functions. The present invention uses a shared memory to reduce the number of existing memory instances. Hardware modules and a processor access this memory.

By using a single memory versus many small dedicated memories, the die size of an Application-Specific Integrated Circuit (ASIC) version of a circuit, such as for a modem or the like, is reduced. This memory typically needs to be very fast. Fast memory (SRAM) is typically very expensive and is not as dense, from an area point of view, as other forms of memory, i.e., DRAM. See, for example, U.S. patent application Ser. No. 10/414,125, filed Apr. 15, 2003, entitled "Software Parameterizable Control Blocks For Use In Physical Layer Processing," which is incorporated by reference as if fully set forth.

The present invention also has other memory available to the processor to store large amounts of data. This memory is implemented by an external, commercially available DRAM or SDRAM chip. Reordering queues and other buffers for storage of data being processed for applications are examples of the uses for this larger, slower memory.

In accordance with the present invention, a data-mover controller has been configured as a hardware accelerator in the movement of data between the fast, hardware accessible memory (SRAM) and the slower, denser memory (DRAM). Not having the hardware accelerator would mean that the processor would have to use a software loop to shuffle the data around, thus expending a large portion of the processor's calculating resources, as measured by Millions of Instructions Per Second (MIPS).

Data is often moved in blocks called Protocol Data Units (PDUs) and Service Data Units (SDUs). These blocks can be encrypted per the 3GPP standard. The process of encrypting and decrypting is also very demanding on the processor. It also requires that the data be accessed, processed, and then written back to memory.

The present invention combines Direct Memory Access (DMA) functionality with ciphering and deciphering in a single hardware accelerator, whereby a data-mover controller not only moves data, but also ciphers or deciphers the data blocks during the data moving process. This saves time since there is hardware assistance and the data is already in the process of being moved. Thus, fewer accesses are required than if separate hardware accelerators were implemented.

In some implementations, each hardware accelerator has its own internal and interface (buffer) memories. The proliferation of many instances of memories increases the size of ASIC implementations of these designs.

The number of memory instances may be reduced by combining many of the interface (buffer) memories into a single shared memory. This memory is accessed by all of the hardware accelerators via a common memory controller. This memory is typically implemented using high speed SRAM. Control software directs the hardware accelerators to perform their respective operations, including where in the shared memory to fetch incoming data and where in the shared memory to deposit the processed results. The present invention provides accelerators for all layer 1 operations, Higher layer control (layer 2 and 3) also has access to this shared memory to communicate with layer 1 and to provide the data to be transmitted and accept data that has been received. Larger, slower, and less dense memories are often used by layer 2/3 processes to hold data from applications that is scheduled to be transmitted or to collect and assemble packets of data for delivery to applications.

Data must be moved between this slower, less dense memory and the faster, (more expensive), memory as packets of information are received or scheduled to be transmitted. These packets must, in some cases, also must be encrypted and/or decrypted.

Accelerators that move data and assist in ciphering have been combined to form the data-mover controller. This combination reduces the number of accesses that must be performed and relieves the processor from the expensive process of moving and ciphering the data.

When the data is moved between layers 1 and 2 or 3, additional layers of control must often be "wrapped" around the data packets. This is often represented in the form of a "header" that is attached to the data packet. The addressing scheme of the data-mover controller accounts for this by permitting the source and/or destination addresses to include an offset. This permits the processor to move data from one memory space to another, but offset the destination data by, for example, 3 bytes. Once the movement has completed, the processor can write the appropriate header information into the area that was reserved for this purpose through the offset. This reduces the data shuffling that sometimes occurs when formatting data for the layer 2 or 3 protocols.

The present invention is a data processing system that can transfer data between a SMA SRAM and a DDR SDRAM. It can also move data from one location in a SDRAM to another location in the same SDRAM. While data is being moved, it can be, if so programmed, passed through logic that performs ciphering calculations.

FIG. 1 shows a block diagram of an exemplary data processing system 100 used for transferring data between an SMA SRAM memory 105 and an SDRAM 110, while at the same time ciphering or deciphering the data in accordance with a preferred embodiment of the present invention. An SMA memory controller 115 serves as an interface between the SMA SRAM 105 and the data processing system 100. An SDRAM memory controller 120 serves as an interface between the SDRAM 110 and the data processing system 100. A processor 125 (i.e., control CPU) maintains control over the data processing system 100, the SMA SRAM 105, SMA memory controller 115, the SDRAM 110 and the SDRAM memory controller 120.

The data processing system 100 includes a data-mover controller 128, a ciphering engine 130, input data registers 135, 140, output data registers 145, 150, input multiplexer (MUX) 155, output MUX 160, and a first-in first-out (FIFO) register 165.

The data-mover controller 128 is programmed by writing the SDRAM 110 address register with the address of the initial word of data to be accessed in the SDRAM 110 memory space. The SMA SRAM 105 address register is written with the address of the initial word of data to be accessed in a memory space in the SMA SRAM 105. A "Num_blocks_to_move" register is written with the number of data blocks to move. The mode register determines the direction of data movement (i.e., "0"=from SMA SRAM 105 to SDRAM 110, "1"=from SDRAM 110 to SMA SRAM 105). The size of each block is also defined, e.g., the number of 32-bit words per block. The total number of 32-bit words transferred is designated as "num_blocks_to_move*block_size". A mode register within the data-mover controller 128 of the data processing system 100 indicates whether data should be transferred directly or whether the data should pass through the ciphering engine 130 as the data transfer occurs. Writing the mode register causes the data-mover controller 128 to initiate a data moving procedure. When data transfer is completed, an interrupt is optionally set by the data-mover controller 128.

A step-by-step example will now be described showing a procedure used by the data processing system 100 to move data from one memory (e.g., the SMA SRAM 105) to another memory (e.g., the SDRAM 110), while passing the data through the ciphering engine 130. A determination is made to move a block of data stored in the SMA SRAM 105 to the SDRAM 110. The processor 125 then writes a control block into the SMA SRAM 105. The control block contains all of the parameters needed to configure the data-mover controller 128 for the intended operation. The processor 125 outputs, via a programmed I/O operation, a control signal (i.e., a start pulse) to the data-mover controller 128 to initiate a data moving operation. The data-mover controller 128, (effectively a state machine), receives the control signal and sequences through a series of states to retrieve the control block from SMA SRAM 105. This is accomplished by properly asserting requests from the SMA memory 105 via the SMA memory controller 115. Data from the SMA memory 105 is input into the register 115 and passed to the appropriate configuration register within the data-mover controller 128.

Once the associated control parameters have been received, the information contained therein is interpreted to further direct the data-mover controller 128 as to what type of function is to be performed. In this example, data is to be moved from the SMA SRAM 105 to the SDRAM 110. If appropriate, the data-mover controller 128 causes the cipher header information contained in the associated registers to pass through the input register 135, input MUX 155, FIFO 165, ciphering engine 130, MUX 160 and out to the SDRAM 110 via the output register 150 and the SDRAM memory controller 120. The data-mover controller 128 continues to sequence through the appropriate states to transfer data from the SMA SRAM 105 until the appropriate number of items has been transferred.

If requested, an interrupt is generated by a register within the data-mover controller 128, indicating that the data movement has been completed. The data-mover controller 128 then checks to see if another control block is available to be moved. If so, another data-mover controller procedure is initiated.

The data-mover controller 128 uses burst accesses to transfer data to/from the DDR-SDRAM 110 and a single word access to/from the SMA SRAM 105. It is up to the programmer to guarantee that the block size and DDR SDRAM 110 address are set such that no single SDRAM burst access will cross an SDRAM page boundary.

Figure 2:
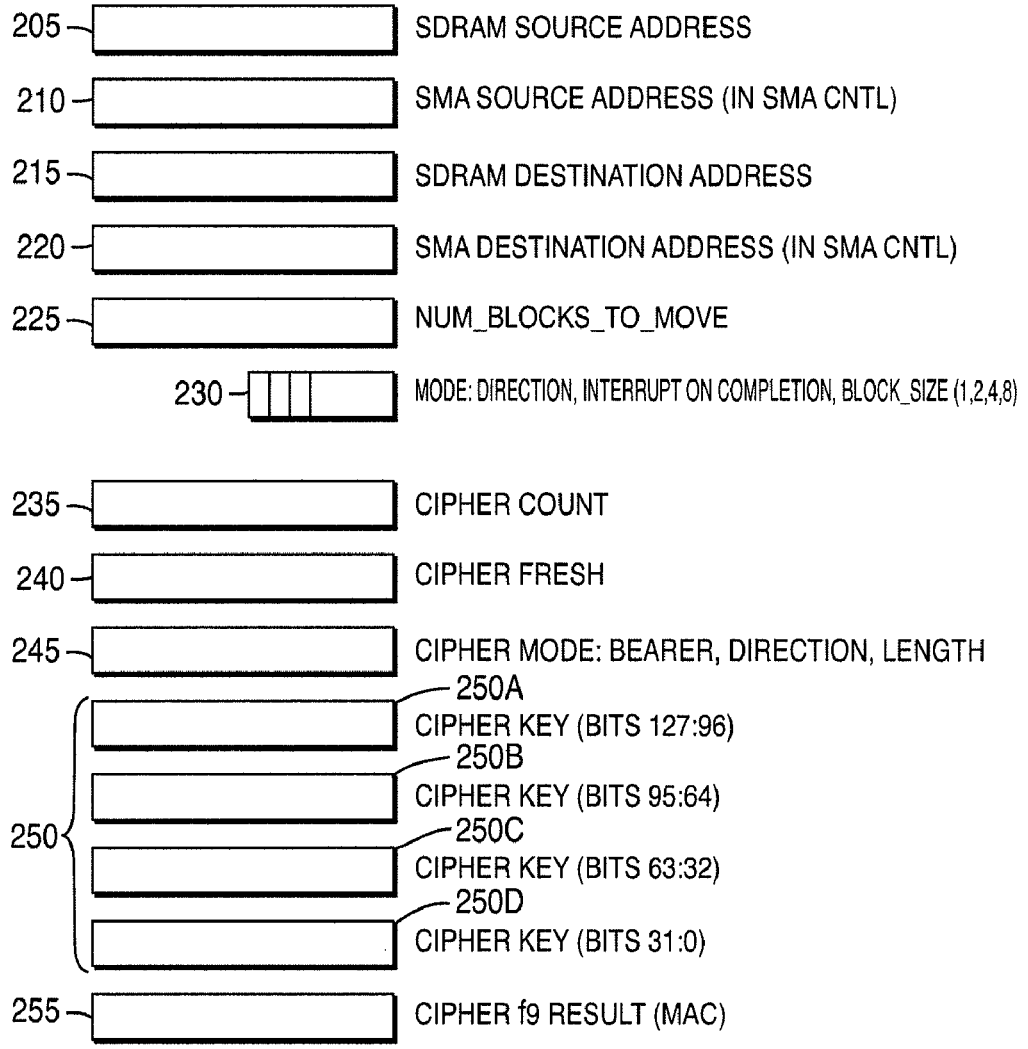
FIG. 2 shows an exemplary configuration of registers incorporated into a data-mover controller.

FIG. 2 shows an exemplary configuration of the registers 205-255 in the data-mover controller 128 of FIG. 1.

FIG. 3 shows a register 205 defining the data-mover controller 128 starting address for source accesses (i.e., reads) to the SDRAM 110 for initiating data transfers to the SMA SRAM 105 or to the SDRAM 110. The address is a byte address and must be aligned to an address that conforms to the block size specified in the "mode" register. The value written to the register relates to the beginning of the SDRAM address space. The address register may only be written when the data-mover controller 128 is idle. The least significant bits are ignored during the access, but are used when ciphering to specify the offset of the data within the word.

FIG. 4 shows a register 215 defining the data-mover controller starting address for destination accesses (i.e., writes) to the SDRAM 110 for initiating data transfers from the SMA SRAM 105 or from the SDRAM 110. The address is a byte address and must be aligned to an address that conforms to the block size specified in the "mode" register. The value written to the register relates to the beginning of the SDRAM address space. The address register may only be written when the data-mover controller 128 is idle. The least significant bits are ignored during the access, but are used when ciphering to specify the offset of the data within the word.

FIG. 5 shows a register 210 defining the data-mover controller 128 starting address for source accesses (i.e., reads) to the SMA SRAM 105. The value written to the register relates to the beginning of the SMA address space. The address register may only be written when the data-mover controller 128 is idle. The least significant bits are ignored during the access, but are used when ciphering to specify the offset of the data within the word.

FIG. 6 shows a register 220 defining the data-mover controller 128 starting address for destination accesses (i.e., writes) to SMA SRAM 105. The starting address for the data-mover controller 128 is specified for the data-mover controller 128 to access the SMA SRAM 105. The value written to the register relates to the beginning of the SMA address space. The address register may only be written when the data-mover controller 128 is idle. The least significant bits are ignored during the access, but are used when ciphering to specify the offset of the data within the word.

FIG. 7 shows a register 225 defining the number of blocks to be moved between the SDRAM 110 and the SMA SRAM 105. When initiated, the data-mover controller will transfer the number of blocks represented by the value in this register. Each block will consist of the number of 32-bit words specified in the "bs" field of the mode register.

FIG. 8 shows a mode register 230 which specifies the mode of the data-mover controller 128. Various fields 805, 810, 815, 820, 825, within the mode register 230 may be written to control the activity of the data-mover controller when in operation.

An "f" field 805 is read-only and indicates to the processor 195 whether or not (i.e., logic 0 for not complete or logic 1 for completed) the data moving operation has been completed.

A "c" field 810 may be written to indicate whether or not data should be passed through the cipher engine, and if so which variety of ciphering to perform. When the "c" field 810 is "00", no ciphering is performed and data simply passes from the source address space to the destination address space. When the "c" field 810 is "01", data is moved from the source address space to the destination address space but is passed through the ciphering engine 145 and encrypted and/ or decrypted using the 3GPP "f8" cipher algorithm as the data movement occurs. When the "c" field 810 is "10", data is accessed from the source address space and passed through the ciphering engine 145 using the 3GPP "f9" cipher algorithm, but the data is not stored. The ciphering engine 145 uses the key and associated control register values to calculate a Message Authentication Code value that is made available to the processor 195 via the register 255.

An "i" field 815 may be programmed to generate an interrupt when the movement of data has completed. When the "i" field 815 is "0", no interrupt is generated. When the "i" field 815 is "1", the interrupt is generated when the data movement operation has completed.

A "d" field 820 identifies one or more memories to be used as the source and destination address spaces and specifies the direction of data movement. For example, when the "d" field 820 is "00", data is moved from the SMA SRAM 105 to the SDRAM 110. When the "d" field 820 is "10", data is moved from the SDRAM 110 to the SMA SRAM 105. When the "d" field 820 is "01", data is moved from one location to another within the SDRAM 110. The "d" field 820 is used to determine which memory address pointers to invoke via access requests.

A "bs" field 825 determines the size of each access block that is to be moved. The "bs" field 825 may be set to a values per block access that indicates one word ("00"=four bytes), two words ("01"=eight bytes), four words ("10"=sixteen bytes), or eight words ("11"=thirty-two bytes). The number of words to be moved and/or ciphered is predetermined by programming the "bs" field 825 and the number of blocks to move. The total data movement is calculated based on the product of the value represented by the "bs" field 825 and the number of blocks specified in register 225.

FIG. 9 shows a register 235 defining the count value embedded in the cipher head.

FIG. 10 shows a register 240 defining a "fresh" value embedded in the cipher head.

FIG. 11 shows a register 245 defining a bearer and direction value that must be placed in the encrypted header and the total number of bits to be encrypted. Registers 235, 240, and 245 contain values that are written by the processor 195 that are defined by the 3GPP standards to be included in the cipher header. When ciphering is included in the data movement, these values are inserted by the data-mover controller in the appropriate locations. The encryption length field specifies how many bits are to pass through the cipher engine. The number of blocks and the number of words per block is predetermined by a programmer and must account for this length.

FIG. 12 shows a register 250 defining a 128-bit key used for ciphering during data movement. The key value is used as described in the 3GPP standard to encrypt/decrypt data when performing the f8 and f9 cipher algorithms.

FIG. 13 shows a register 255 which provides a calculated MAC value. The f9 cipher algorithm creates a signature using the key value and the values of the data stream presented to it. This signature is reported as the MAC for use by the system.

The description of the registers disclosed herein is exemplary in nature, whereby other arbitrary definitions could be derived based on a combination of control fields to perform the same functionality.

While the present invention has been described in terms of the preferred embodiment, other variations which are within the scope of the invention as outlined in the claims below will be apparent to those skilled in the art.

What is claimed is:

1. A data processor for ciphering and transferring data between a first memory unit and a second memory unit, the data processor comprising:
a ciphering engine for ciphering data while it is being transferred between the memory units;
a multiplexer (MUX); and
a data-mover controller including at least one register having a first field specifying whether the data should be allowed to pass through the ciphering engine, which outputs the data to the MUX via a first path after ciphering the data, or whether the data should be transferred directly to the MUX via a second path without passing through the ciphering engine.

2. The data processor of claim 1 further comprising:
first and second data registers electrically coupled to an output of the MUX;
a processor electrically coupled to the first memory unit and the second memory unit for writing a control block into the first memory unit, the control block including control parameters needed to configure the data-mover controller, and for outputting a control signal to the data-mover controller to initiate a data moving operation;
a first controller electrically coupled to the first memory unit and the first data register, the data mover controller and the processor for controlling the first memory unit; and
a second controller electrically coupled to the second memory unit and the second data register, the data mover controller and the processor for controlling the second memory unit, wherein the data-mover controller retrieves the control block from the first memory unit in response to receiving the control signal from the processor, and the data-mover controller determines which type of function is to be performed based on the control parameters in the retrieved control block.

3. The data processor of claim 1 wherein if the first field specifies that the transferred data should be ciphered, the first field also specifies the type of ciphering that is to be performed by the ciphering engine.

4. The data processor of claim 3 wherein the type of ciphering that is to be performed by the ciphering engine is a standardized confidentially cipher algorithm f8.

5. The data processor of claim 3 wherein the type of ciphering that is to be performed by the ciphering engine is a standardized integrity cipher algorithm f9.

6. The data processor of claim 5 wherein the register includes a second field which specifies a message authentication code (MAC) value calculated by the standardized integrity cipher algorithm f9.

7. The data processor of claim 1 wherein the register includes a second field which specifies whether data is moved from the first memory unit to the second memory unit, or from the second memory unit to the first memory unit.

8. The data processor of claim 1 wherein the register includes a second field which specifies the size of a block of data to be transferred by the data-mover controller.

9. The data processor of claim 8 wherein the data block size is four bytes.

10. The data processor of claim 8 wherein the data block size is eight bytes.

11. The data processor of claim 8 wherein the data block size is sixteen bytes.

12. The data processor of claim 8 wherein the data block size is thirty-two bytes.

13. The data processor of claim 1 wherein the register includes a second field which specifies the number of data blocks to be transferred by the data-mover controller.

14. The data processor of claim 1 wherein the first memory is a share memory architecture (SMA) static random access memory (SRAM).

15. The data processor of claim 1 wherein the second memory is a synchronous dynamic random access memory (SDRAM).

16. The data processor of claim 1 wherein the first and second memory units differ in processing speed.

17. The data processor of claim 1 wherein the register includes a second field which specifies whether an interrupt pulse should be generated when the transfer of data is completed.

18. The data processor of claim 1 wherein the register includes a second field which specifies a value embedded in a cipher header and processed by the ciphering engine.

19. The data processor of claim 1 wherein the register includes a second field which specifies an encryption length.

20. The data processor of claim 1 wherein the register includes a second field which specifies a value embedded in an encrypted header and processed by the ciphering engine.

21. The data processor of claim 1 wherein the register includes a second field which specifies a key used by the ciphering engine for ciphering the data as it is moved.

22. The data processor of claim 21 wherein the key is a 128-bit key.

23. A wireless transmit/receive unit (WTRU) for ciphering and transferring data between a first memory unit and a second memory unit, the WTRU comprising:
   a ciphering engine for ciphering data while it is being transferred between the memory units;
   a multiplexer (MUX); and
   a data-mover controller including at least one register having a first field specifying whether the data should be allowed to pass through the ciphering engine, which outputs the data to the MUX via a first path after ciphering the data, or whether the data should be transferred directly to the MUX via a second path without passing through the ciphering engine.

24. The WTRU of claim 23 further comprising:
   first and second data registers electrically coupled to an output of the MUX;
   a processor electrically coupled to the first memory unit and the second memory unit for writing a control block into the first memory unit, the control block including control parameters needed to configure the data-mover controller, and for outputting a control signal to the data-mover controller to initiate a data moving operation;
   a first controller electrically coupled to the first memory unit and the first data register, the data mover controller and the processor for controlling the first memory unit; and
   a second controller electrically coupled to the second memory unit and the second data register, the data mover controller and the processor for controlling the second memory unit, wherein the data-mover controller retrieves the control block from the first memory unit in response to receiving the control signal from the processor, and the data-mover controller determines which type of function is to be performed based on the control parameters in the retrieved control block.

25. The WTRU of claim 23 wherein if the first field specifies that the transferred data should be ciphered, the first field also specifies the type of ciphering that is to be performed by the ciphering engine.

26. The WTRU of claim 25 wherein the type of ciphering that is to be performed by the ciphering engine is a standardized confidentially cipher algorithm f8.

27. The WTRU of claim 25 wherein the type of ciphering that is to be performed by the ciphering engine is a standardized integrity cipher algorithm f9.

28. The WTRU of claim 27 wherein the register includes a second field which specifies a message authentication code (MAC) value calculated by the standardized integrity cipher algorithm f9.

29. The WTRU of claim 23 wherein the register includes a second field which specifies whether data is moved from the first memory unit to the second memory unit, or from the second memory unit to the first memory unit.

30. The WTRU of claim 23 wherein the register includes a second field which specifies the size of a block of data to be transferred by the data-mover controller.

31. The WTRU of claim 30 wherein the data block size is four bytes.

32. The WTRU of claim 30 wherein the data block size is eight bytes.

33. The WTRU of claim 30 wherein the data block size is sixteen bytes.

34. The WTRU of claim 30 wherein the data block size is thirty-two bytes.

35. The WTRU of claim 23 wherein the register includes a second field which specifies the number of data blocks to be transferred by the data-mover controller.

36. The WTRU of claim 23 wherein the first memory is a share memory architecture (SMA) static random access memory (SRAM).

37. The WTRU of claim 23 wherein the second memory is a synchronous dynamic random access memory (SDRAM).

38. The WTRU of claim 23 wherein the first and second memory units differ in processing speed.

39. The WTRU of claim 23 wherein the register includes a second field which specifies whether an interrupt pulse should be generated when the transfer of data is completed.

40. The WTRU of claim 23 wherein the register includes a second field which specifies a value embedded in a cipher header and processed by the ciphering engine.

41. The WTRU of claim 23 wherein the register includes a second field which specifies an encryption length.

42. The WTRU of claim 23 wherein the register includes a second field which specifies a value embedded in an encrypted header and processed by the ciphering engine.

43. The WTRU of claim 23 wherein the register includes a second field which specifies a key used by the ciphering engine for ciphering the data as it is moved.

44. The WTRU of claim 43 wherein the key is a 128-bit key.

* * * * *